2,927,003
PROCESS FOR THE RECOVERY OF HYDROGEN WHICH HAS BEEN ENRICHED IN DEUTERIUM

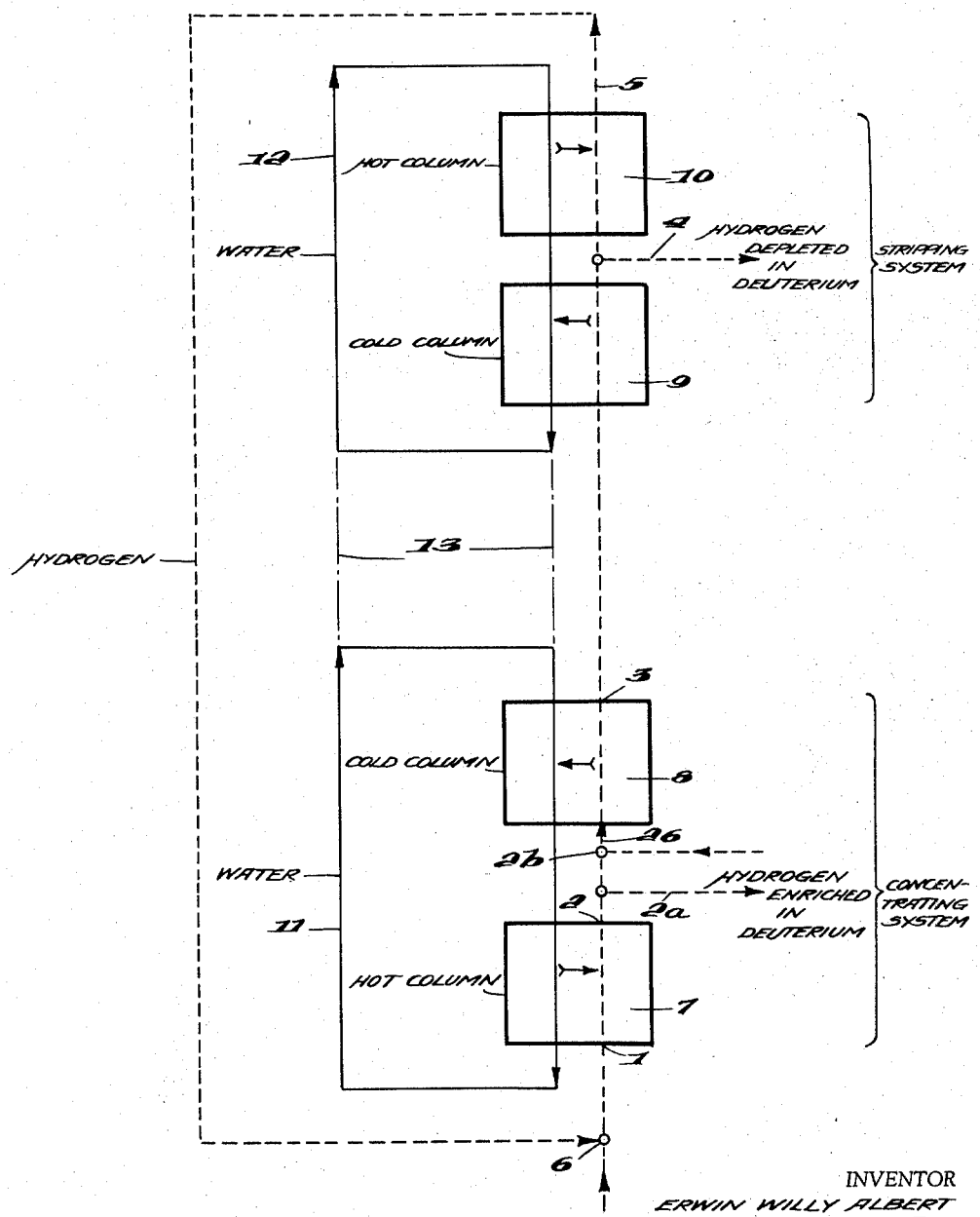

Erwin Willy Albert Becker, Marburg (Lahn), Germany

Application April 29, 1957, Serial No. 655,597

Claims priority, application Germany April 30, 1956

4 Claims. (Cl. 23—211)

The present invention relates to improvements in a method of recovering water or hydrogen enriched in deuterium, such as is described in my earlier application, Serial No. 531,980, filed September 1, 1956, which involves an exchange of deuterium between water and hydrogen in the presence of a catalyst.

According to one embodiment of the process disclosed in application Serial No. 531,980, "natural" hydrogen with the normal deuterium content is enriched in deuterium corresponding to the partition coefficient $K_2$ of deuterium between water and hydrogen in a hot exchange column maintained at a higher temperature $T_2$. Thereafter, a small portion of this hydrogen is branched off and is further worked up in a system of "hot" and "cold" columns, while the main portion of such hydrogen is passed through a "cold" column maintained at a lower temperature $T_1$ countercurrent to water which is passed in a closed cycle through both columns to give up deuterium to the water corresponding to the partition coefficient $K_1$. Expediently, the portion of the hydrogen which was branched off is also passed through the "cold" column after a portion of the deuterium had been extracted therefrom so as to lower its deuterium content further.

Deuterium is only contained in "natural" hydrogen in a proportion of 1:7000. In the process disclosed in application Serial No. 531,980, a deuterium yield of only 20 to 30% could be attained when economy of operation is taken into consideration. Consequently, for operation upon a technical scale, very large quantities of fresh hydrogen are required.

According to the invention it was unexpectedly found that the yield of deuterium could be increased substantially if the hydrogen which has been depleted in deuterium during passage through the "cold" column of the "hot-cold" concentrating system of the process described above is passed through a second cold so-called stripping column where its deuterium content is decreased even further. A portion of the resulting hydrogen of very low deuterium content is drawn off and used for chemical purposes, whereas the remainder is brought up substantially to the original deuterium content in a hot column which is associated with the "cold" stripping column. This hydrogen is then recycled to the hot column of the concentrating system according to application Serial No. 531,980 and worked up further therein as described in such application. A quantity of fresh hydrogen is continuously supplied to the recovery system which is equivalent to the quantity of stripped hydrogen and enriched hydrogen drawn off. Preferably, the fresh hydrogen is supplied continuously at the foot of the hot column of the concentrating system.

The accompanying drawing diagrammatically shows an apparatus system for carrying out the process according to the invention.

With reference to the drawing, "natural" hydrogen, such as, for example, is customarily employed in hydrogenation plants, is supplied at 1 to the bottom of "hot" column 7 and passed countercurrently therein to water enriched in deuterium whereby the exchange equilibrium is established. The hydrogen leaving at 2 is enriched in deuterium. A portion thereof (about ⅓) is withdrawn at 2a and passed through a second "hot-cold" system in which a fraction thereof is further enriched in deuterium. The hydrogen poor in deuterium resulting from the second "hot-cold" system is mixed at 2b with the remaining two-thirds of the hydrogen leaving "hot" column 7 and passed into "cold" column 8 at 2c. In column 8, equilibrium is established with the deuterium poor water which corresponds to the lower temperaure at which such column operates; that is a portion of the deuterium migrates out of the hydrogen into the water. The deuterium transfer from the "cold" to the "hot" column of the concentrating system therefore is effected by the water cycle 11. The hydrogen gas leaving column 8 at 3 contains about 20 to 30% less deuterium than "natural" hydrogen. According to the invention, this hydrogen is further depleted in deuterium by passage through a "cold" stripping column 9 and then divided into two streams, one of which is drawn off at 4 and used for other purposes, such as, for example, hydrogenation, and the other of which is passed through a further "hot" column 10 which is connected to "cold" column 9 by a closed water cycle 12 in which its deuterium content is again brought up to that of "natural" hydrogen and this resulting hydrogen is then added at 6 to the fresh hydrogen which is supplied to column 7 at 1.

It is particularly expedient, as indicated by the interrupted lines 13 to combine water cycle 12 with water cycle 11 to one closed water cycle which flows countercurrent to the hydrogen.

Further advantages are attained by providing for heat exchange between the quantities of liquid or, respectively, of gas which are at different temperatures, preferably of the same phase. For example, about 90% of the energy which would be required when operating without heat exchange can be saved by heat exchange between the water leaving the "hot" column 10 of the stripping system and that leaving cold column 8 of the concentrating system in order to raise the temperature of the water leaving column 8 to the temperature required for hot column 9.

The catalyst required for acceleration of the exchange reaction can be employed in any desired form. However, especially good results are attained when the catalyst is dispersed in or colloidally dissolved in the liquid water phase. For example, the liquid water phase can be a 1 to 3% platinum sol or such phase can be a dispersion of 20 g. activated carbon powder containing 10% Pt per 140 g. of water.

Preferably, the hot and the cold columns of the concentrating and stripping systems are respectively maintained at the same temperature and pressure. For example, the cold columns can be maintained at a temperature below 100° C., preferably between 20 and 50° C., and the hot column at a temperature above 150° C., preferably about 200° C. The pressures employed should be at least 10 atmospheres gauge and preferably should be about 100 atmospheres gauge.

According to the improved process of the invention, about 70 to 80% of the deuterium content of natural hydrogen is removed and recovered rather than the 20 to 30% removal which could be attained by the prior process. A special advantage of the process according to the invention is that the quantity of fresh "natural" hydrogen supplied for a particular desired separation is substantially less than that required when the process according to application Serial No. 531,980 without using a stripping system is employed.

The yields obtained according to the invention can be varied within wide limits by proper choice of operating conditions, apparatus arrangement and quantities of hydrogen and water passed through the systems. The process according to the invention in principle can also be employed with other embodiments of the process described in my earlier application Serial No. 531,980.

I claim:

1. In a method for the recovery of hydrogen enriched with deuterium employing hydrogen containing deuterium as the primary source of deuterium in an exchange concentrating system in which streams of hydrogen and liquid water are passed countercurrently to each other in deuterium exchange relation in the presence of a catalyst promoting such exchange serially through two columns maintained at different temperatures, the hydrogen first passing through the column maintained at the higher temperature and then through the column maintained at a lower temperature and the liquid water first passing through the column maintained at the lower temperature and then through the column maintained at the higher temperature, the liquid water being passed through said columns being maintained in a closed cycle, and hydrogen enriched in deuterium is withdrawn from the hydrogen stream between the two columns and the hydrogen leaving the column maintained at the lower temperature is depleted in deuterium, the steps which comprise passing all of the hydrogen leaving the column of said concentrating system maintained at the lower temperature to the first of two columns maintained at different temperatures of a stripping system in which stripping system streams of the hydrogen and liquid water are passed countercurrent to each other in deuterium exchanging relationship in the presence of a catalyst promoting such exchange serially through such columns, the hydrogen from the column of the concentrating system maintained at the lower temperature first passing through the column of the stripping system maintained at the lower temperature and then passing through the column of said stripping system maintained at the higher temperature and the liquid water first passing through the column of said stripping system maintained at the higher temperature and then through the column of the stripping system maintained at the lower temperature, the liquid water being passed through the columns of said stripping system being maintained in a closed cycle, withdrawing a portion of the hydrogen from the stream of hydrogen leaving the column of the stripping system maintained at the lower temperature to provide a hydrogen which is still further depleted in deuterium, the remaining portion of said stream of hydrogen being passed through the column of the stripping system maintained at the higher temperature wherein its deuterium content is increased again and then recycling the hydrogen leaving the column of the stripping system maintained at the higher temperature to the column of the concentrating system maintained at the higher temperature.

2. The process of claim 1 in which the water cycles of the concentrating and stripping systems are combined into one closed cycle in which the water is first passed through the column of the stripping system maintained at the higher temperature and then sequentially through the column of the stripping system maintained at the lower temperature, the column of the concentrating system maintained at the lower temperature and the column of the concentrating system maintained at the higher temperature.

3. The process of claim 1 in which fresh hydrogen containing deuterium employed as the primary source of deuterium is introduced into the hydrogen leaving the column of the stripping system maintained at the higher temperature before it is introduced into the column of the concentrating system maintained at the higher temperature.

4. The process of claim 1 in which the corresponding columns of the concentrating and stripping systems are maintained at substantially the same temperature and pressure.

References Cited in the file of this patent

UNITED STATES PATENTS 2,787,526   Spevack _____ Apr. 2, 1957